US009466175B2

(12) United States Patent
Arnone

(10) Patent No.: US 9,466,175 B2
(45) Date of Patent: *Oct. 11, 2016

(54) TRANSPORTABLE VARIABLES IN HYBRID GAMES

(71) Applicant: Gamblit Gaming, LLC, Glendale, CA (US)

(72) Inventor: Miles Arnone, Sherborn, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/175,986

(22) Filed: Feb. 7, 2014

(65) Prior Publication Data

US 2014/0155146 A1    Jun. 5, 2014

Related U.S. Application Data

(63) Continuation of application No. PCT/US2013/021786, filed on Jan. 17, 2013.

(60) Provisional application No. 61/632,110, filed on Jan. 19, 2012.

(51) Int. Cl.
*A63F 13/00* (2014.01)
*G07F 17/32* (2006.01)
(Continued)

(52) U.S. Cl.
CPC ......... *G07F 17/3234* (2013.01); *A63F 13/352* (2014.09); *A63F 13/792* (2014.09); *G07F 17/3244* (2013.01)

(58) Field of Classification Search
CPC .............. G07F 17/23; G07F 17/2302; G07F 17/3223; G07F 17/3225; G07F 17/3258; G07F 17/3262; G07F 17/3267; G07F 17/3295; A63F 2300/00; A63F 2300/5513; A63F 2300/558; A63F 2300/61; A63F 2300/64

USPC ......... 463/2, 7, 16, 25, 42; 705/14.12, 14.14
See application file for complete search history.

(56) References Cited

U.S. PATENT DOCUMENTS 5,413,357 A   5/1995   Schulze et al.
5,718,429 A   2/1998   Keller
(Continued)

FOREIGN PATENT DOCUMENTS

JP   2001300098 A   10/2001
JP   2003111980 A   4/2003
(Continued)

OTHER PUBLICATIONS

ITL.NIST.GOV, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.

(Continued)

*Primary Examiner* — Tramar Harper
*Assistant Examiner* — Jeffrey Wong
(74) *Attorney, Agent, or Firm* — Frank Cire

(57) ABSTRACT

Systems and methods in accordance with embodiments of the invention include: an entertainment game that provides outcomes based upon skillful execution of the entertainment game by utilizing elements, where elements are a limited resource consumed within an entertainment game to advance entertainment game gameplay; a gambling game constructed to provide a randomly generated payout of elements from a wager of elements; and a transportable variables module constructed to: communicate an entertainment gameplay gambling event occurrence based upon a player's skillful execution of the entertainment game that triggers the wager of elements in the gambling game to the gambling game; associate elements with the player based upon elements accrued during the player's skillful execution of the entertainment game and the randomly generated payout of elements from the gambling game; and determine a cash out value of real world credits for the player based upon elements associated with the player.

14 Claims, 11 Drawing Sheets

(51) Int. Cl.
   *A63F 13/792*   (2014.01)
   *A63F 13/352*   (2014.01)

(56) References Cited

U.S. PATENT DOCUMENTS

| | | |
|---|---|---|
| 5,785,592 A | 7/1998 | Jacobsen |
| 5,853,324 A | 12/1998 | Kami et al. |
| 5,963,745 A | 10/1999 | Collins et al. |
| 6,050,895 A | 4/2000 | Luciano |
| 6,165,071 A | 12/2000 | Weiss |
| 6,227,974 B1 | 5/2001 | Eilat |
| 6,267,669 B1 | 7/2001 | Luciano |
| 6,685,563 B1 | 2/2004 | Meekins et al. |
| 6,712,693 B1 | 3/2004 | Hettinger |
| 6,761,632 B2 | 7/2004 | Bansemer et al. |
| 6,761,633 B2 | 7/2004 | Riendeau |
| 6,764,397 B1 | 7/2004 | Robb |
| 6,811,482 B2 | 11/2004 | Letovsky |
| 7,118,105 B2 | 10/2006 | Benevento |
| 7,294,058 B1 | 11/2007 | Slomiany |
| 7,326,115 B2 | 2/2008 | Baerlocher |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,766,742 B2 | 8/2010 | Bennett et al. |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,938,727 B1 | 5/2011 | Konkle |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,047,908 B2 | 11/2011 | Walker |
| 8,047,915 B2 | 11/2011 | Lyle |
| 8,060,829 B2 | 11/2011 | Jung et al. |
| 8,075,383 B2 | 12/2011 | Friedman et al. |
| 8,087,999 B2 | 1/2012 | Oberberger |
| 8,113,938 B2 | 2/2012 | Friedman et al. |
| 8,118,654 B1 | 2/2012 | Nicolas |
| 8,128,487 B2 | 3/2012 | Hamilton et al. |
| 8,135,648 B2 | 3/2012 | Oram |
| 8,137,193 B1 | 3/2012 | Kelly et al. |
| 8,142,272 B2 | 3/2012 | Walker |
| 8,157,653 B2 | 4/2012 | Buhr |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 8,475,266 B2 | 7/2013 | Arnone |
| 8,480,470 B2 | 7/2013 | Napolitano et al. |
| 2001/0004609 A1 | 6/2001 | Walker et al. |
| 2001/0019965 A1 | 9/2001 | Ochi |
| 2002/0022509 A1 | 2/2002 | Nicastro |
| 2002/0049082 A1* | 4/2002 | Bansemer et al. ............ 463/20 |
| 2002/0090990 A1 | 7/2002 | Joshi et al. |
| 2002/0175471 A1 | 11/2002 | Faith |
| 2003/0060286 A1 | 3/2003 | Walker et al. |
| 2003/0119576 A1 | 6/2003 | McClintic et al. |
| 2003/0139214 A1 | 7/2003 | Wolf et al. |
| 2003/0171149 A1 | 9/2003 | Rothschild |
| 2003/0204565 A1 | 10/2003 | Guo et al. |
| 2003/0211879 A1 | 11/2003 | Englman |
| 2004/0092313 A1 | 5/2004 | Saito et al. |
| 2004/0102238 A1 | 5/2004 | Taylor |
| 2004/0121839 A1 | 6/2004 | Webb |
| 2004/0225387 A1 | 11/2004 | Smith |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0233806 A1 | 10/2005 | Kane et al. |
| 2005/0239538 A1 | 10/2005 | Dixon |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0035696 A1 | 2/2006 | Walker |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0223611 A1 | 10/2006 | Baerlocher |
| 2006/0234791 A1 | 10/2006 | Nguyen et al. |
| 2006/0240890 A1 | 10/2006 | Walker |
| 2006/0246403 A1 | 11/2006 | Monpouet et al. |
| 2006/0258433 A1 | 11/2006 | Finocchio et al. |
| 2007/0026924 A1 | 2/2007 | Taylor |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0099696 A1 | 5/2007 | Nguyen et al. |
| 2007/0117641 A1 | 5/2007 | Walker et al. |
| 2007/0129149 A1 | 6/2007 | Walker |
| 2007/0156509 A1 | 7/2007 | Jung et al. |
| 2007/0167212 A1 | 7/2007 | Nguyen |
| 2007/0167239 A1 | 7/2007 | O'Rourke |
| 2007/0173311 A1 | 7/2007 | Morrow et al. |
| 2007/0191104 A1 | 8/2007 | Van Luchene |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |

(56) References Cited

U.S. PATENT DOCUMENTS

| | | |
|---|---|---|
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0275411 A1 | 11/2009 | Kisenwether |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1 | 11/2012 | Luciano |
| 2012/0322545 A1* | 12/2012 | Arnone et al. ................. 463/25 |
| 2013/0029760 A1 | 1/2013 | Wickett |
| 2013/0131848 A1 | 5/2013 | Arnone et al. |
| 2013/0190074 A1 | 7/2013 | Arnone et al. |

FOREIGN PATENT DOCUMENTS

| | | |
|---|---|---|
| JP | 2004097610 A | 4/2004 |
| JP | 2004166746 A | 6/2004 |
| WO | 9851384 A1 | 11/1998 |
| WO | 2010087090 A1 | 8/2010 |
| WO | 2011109454 A1 | 9/2011 |
| WO | 2012139083 A1 | 10/2012 |
| WO | 2013059308 A1 | 4/2013 |

OTHER PUBLICATIONS

Changing the Virtual Self: Avatar Transformations in Popular Games; Barr et al., Victoria Univ., NZ, 2006.
Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
WIPO—ISA, International Search Report and Written Opinion, PCT/US13/021786, Mar. 22, 2013.

* cited by examiner

TRANSPORTABLE VARIABLES IN HYBRID GAMES

CROSS REFERENCE TO RELATED APPLICATIONS

This application is a continuation of PCT Application No. PCT/US 13/21786, filed Jan. 17, 2013, which claims the benefit of U.S. Provisional Patent Application No. 61/632,110, filed on Jan. 19, 2012, the contents of each of which are hereby incorporated by reference in their entirety as if stated in full herein. This application references Patent Cooperation Treaty Application No. PCT/US11/26768, filed Mar. 1, 2011, Patent Cooperation Treaty Application No. PCT/US11/63587, filed Dec. 6, 2011, and Patent Cooperation Treaty Application No. PCT/US12/58156, filed Sep. 29, 2012, each disclosure of which is hereby incorporated by reference in its entirety.

FIELD OF THE INVENTION

Embodiments of the present invention are generally related to gaming and more specifically to a transportable elements hybrid game that includes both an entertainment game and a gambling game with a transportable variables module that manages element wagers and relationships between real world credits and elements.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY OF THE INVENTION

Systems and methods in accordance with embodiments of the invention operate a transportable variables hybrid game. One embodiment includes a transportable variables hybrid game, including: an entertainment software engine constructed to execute an entertainment game that provides outcomes based upon skillful execution of the entertainment game by utilizing elements, where elements are a limited resource consumed within an entertainment game to advance entertainment game gameplay; a real world engine constructed to provide a randomly generated payout of elements from a wager of elements in a gambling game; and a game world engine constructed to manage the entertainment software engine and facilitate communication between the entertainment software engine and the real world engine; where the game world engine utilizes a transportable variables module constructed to: communicate an entertainment gameplay gambling event occurrence based upon a player's skillful execution of the entertainment game that triggers the wager of elements in the gambling game to the gambling game; associate elements with the player based upon elements accrued during the player's skillful execution of the entertainment game and the randomly generated payout of elements from the gambling game; and determine a cash out value of real world credits for the player based upon elements associated with the player, wherein the transportable variables module is constructed to generate elements for a player from real world credits provided by a player to the transportable variables hybrid game based upon a function of at least a portion of an entertainment game's variable set in determining a conversion rate between real world credits provided and elements generated as instructed by an operator that hosts the transportable variables hybrid game, where the entertainment game's variable set are aspects of an entertainment game that can vary during gameplay progression.

In another embodiment, the entertainment game's variable set includes at least one variable selected from the group consisting of enabling elements that are immediately consumable elements, reserve enabling elements that convert into enabling elements upon occurrence of a release event in transportable variable hybrid game gameplay, actionable elements that trigger a wager executable by the real world engine when acted upon, required objects in an entertainment game necessary for an actionable element to be acted upon, required environmental conditions that are a game state necessary within an entertainment game for an actionable element to be acted upon, and controlled entity characteristics which is a status necessary for a controlled entity associated with a player for an actionable element to be acted upon.

In a still further embodiment, the cash out value of real world credits for the player is based upon an inverse function of a ratio of elements to real world credits utilized to generate the elements associated the player.

In still another embodiment, the cash out value of real world credits for the player is based upon an inverse function of at least a portion of an entertainment game's variable set in determining a conversion rate between real world credits and elements as instructed by an operator that hosts the transportable variables hybrid game, where the entertainment game's variable set are aspects of an entertainment game that can vary during gameplay progression.

In a yet further embodiment, the entertainment game's variable set includes at least one variable selected from the group consisting of enabling elements that are immediately consumable elements that enable a player's play of the entertainment game, reserve enabling elements that convert into enabling elements upon occurrence of a release event in transportable variable hybrid game gameplay, actionable elements that trigger a wager in a gambling game when acted upon, required objects in an entertainment game necessary for an actionable element to be acted upon, required environmental conditions that are a game state necessary within an entertainment game for an actionable element to be acted upon, and controlled entity characteristics which is a status necessary for a controlled entity associated with a player for an actionable element to be acted upon.

In yet another embodiment, the elements include at least one element type selected from the group consisting of enabling elements, reserve enabling elements and actionable elements, where: enabling elements are elements that are immediately consumable; reserve enabling elements are elements that convert into enabling elements upon occurrence of a release event in transportable variable hybrid game gameplay; and actionable elements are elements that trigger a wager executable by the real world engine when acted upon.

In a further embodiment again, the transportable variables module is constructed to determine wager terms associated with the entertainment gameplay gambling event occurrence that define how elements are wagered by the real world engine.

In another embodiment again, the wager terms include at least one wager term selected from the group consisting of odds of return for wagers in a pay table, and a relationship between a real world credits and elements.

In a further additional embodiment, a player of a transportable variables hybrid game is an electronic representation of interactions associated with a player profile of the transportable variables hybrid game.

In another additional embodiment, the transportable variables controller is constructed to execute on the game world engine.

In a still yet further embodiment, the transportable variables controller is constructed to execute on a transportable variables server and communicate with the game world engine via a network.

A still yet another embodiment includes a method of operating a transportable variables hybrid game, the method including: communicating an entertainment gameplay gambling event occurrence based upon a player's skillful execution of an entertainment game from a game world engine to a real world engine that trigger a wager of elements in a gambling game executed by the real world engine using a transportable variables module utilized by the game world engine, where: the game world engine is constructed to manage the entertainment software engine and facilitate communication between the entertainment software engine and the real world engine; the entertainment software engine is constructed to execute the entertainment game that provides outcomes based upon skillful execution of the entertainment game by utilizing elements, where elements are a limited resource consumed within the entertainment game to advance entertainment game gameplay; and the real world engine is constructed to provide a randomly generated payout of elements from a wager of elements in the gambling game; associating elements with the player based upon elements accrued during the player's skillful execution of the entertainment game and the randomly generated payout of elements from the gambling game using the transportable variables module; and determining a cash out value of real world credits for the player based upon elements associated with the player using the transportable variables module.

In a still further embodiment again, the transportable variables module is constructed to generate elements for a player from real world credits provided by a player to the transportable variables hybrid game based upon a function of at least a portion of entertainment game's variable set in determining a conversion rate between real world credits provided and elements generated as instructed by an operator that hosts the transportable variables hybrid game, where the entertainment game's variable set are aspects of an entertainment game that can vary during gameplay progression.

In a still another embodiment again, the entertainment game's variable set includes at least one variable selected from the group consisting of enabling elements that are immediately consumable elements, reserve enabling elements that convert into enabling elements upon occurrence of a release event in transportable variable hybrid game gameplay, actionable elements that trigger a wager executable by the real world engine when acted upon, required objects in an entertainment game necessary for an actionable element to be acted upon, required environmental conditions that are a game state necessary within an entertainment game for an actionable element to be acted upon and controlled entity characteristics which is a status necessary for a controlled entity associated with a player for an actionable element to be acted upon.

In a still further additional embodiment, the cash out value of real world credits for the player is based upon an inverse function of the ratio of elements to real world credits utilized to generate the elements associated the player.

In a yet further embodiment again, the cash out value of real world credits for the player is based upon an inverse function of at least a portion of an entertainment game's variable set in determining a conversion rate between real world credits and elements as instructed by an operator that hosts the transportable variables hybrid game, where the entertainment game's variable set are aspects of an entertainment game that can vary during gameplay progression.

In yet another embodiment again, the entertainment game's variable set includes at least one variable selected from the group consisting of enabling elements that are immediately consumable elements that enable a player's play of the entertainment game, reserve enabling elements that convert into enabling elements upon occurrence of a release event in transportable variable hybrid game gameplay, actionable elements that trigger a wager in a gambling game when acted upon, required objects in an entertainment game necessary for an actionable element to be acted upon, required environmental conditions that are a game state necessary within an entertainment game for an actionable element to be acted upon and controlled entity characteristics which is a status necessary for a controlled entity associated with a player for an actionable element to be acted upon.

In a yet further additional embodiment, the elements include at least one element type selected from the group consisting of enabling elements, reserve enabling elements and actionable elements, where: enabling elements are elements that are immediately consumable; reserve enabling elements are elements that convert into enabling elements upon occurrence of a release event in transportable variable hybrid game gameplay; and actionable elements are elements that trigger a wager executable by the real world engine when acted upon.

A yet another additional embodiment includes a machine readable medium containing processor instructions, where execution of the instructions by a processor causes the processor to perform a process including: communicating an entertainment gameplay gambling event occurrence based upon a player's skillful execution of an entertainment game from a game world engine to a real world engine that trigger a wager of elements in a gambling game executed by the real world engine using a transportable variables module utilized by the game world engine of a transportable variables hybrid game, where: the game world engine is constructed to manage the entertainment software engine and facilitate communication between the entertainment software engine and the real world engine; the entertainment software engine is constructed to execute the entertainment game that provides outcomes based upon skillful execution of the entertainment game by utilizing elements, where elements are a limited resource consumed within the entertainment game to advance entertainment game gameplay; and the real world engine is constructed to provide a randomly generated payout of elements from a wager of elements in the gambling game; associating elements with the player based upon elements accrued during the player's skillful execution of the entertainment game and the randomly generated payout of elements from the gambling game using the transportable variables module; and determining a cash out value of real world credits for the player based upon elements associated with the player using the transportable variables module.

DETAILED DESCRIPTION

Figure 1:
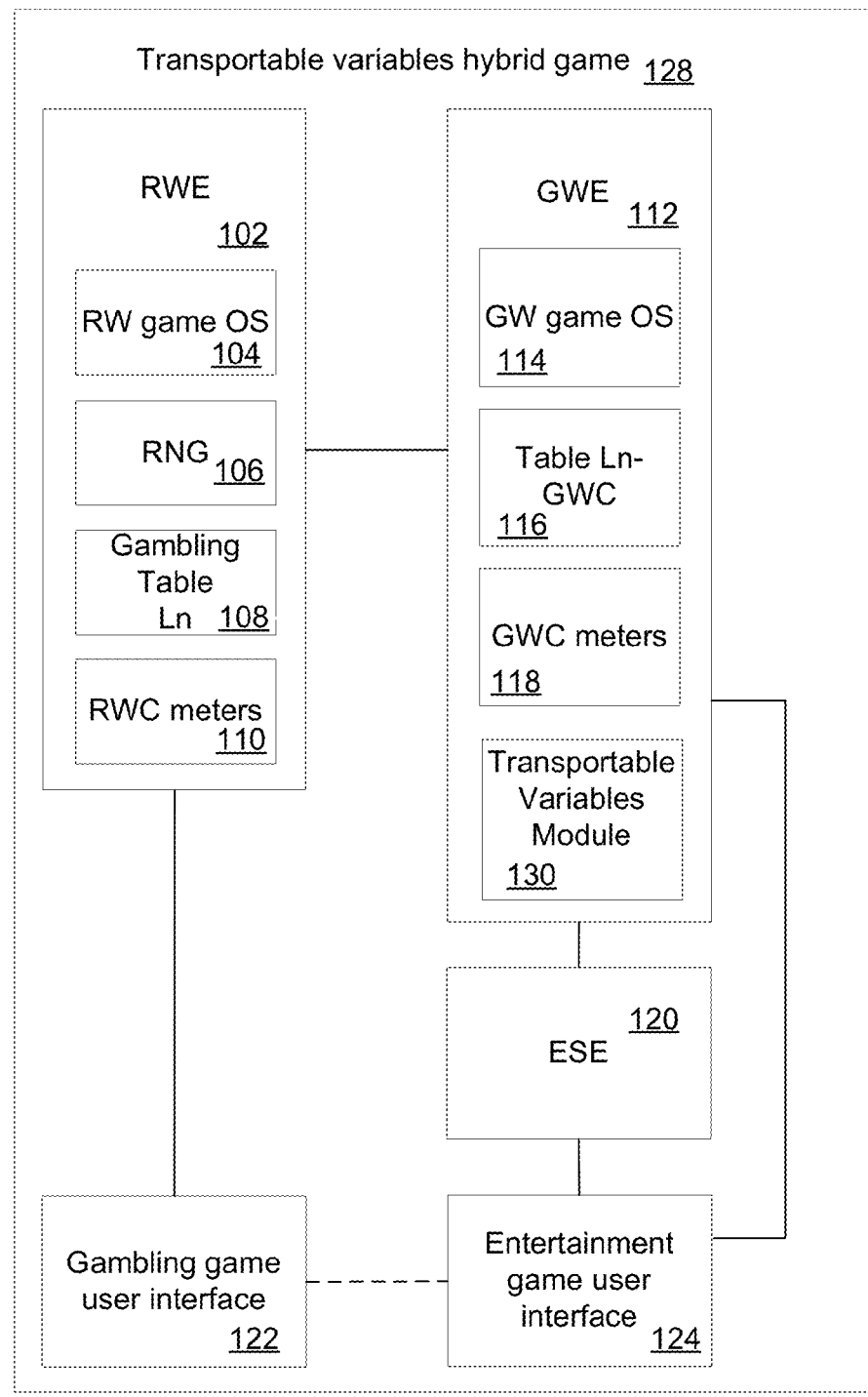
FIG. 1 illustrates a transportable variables hybrid game in accordance with an embodiment of the invention.

Turning now to the drawings, systems and methods for operation of a transportable variables hybrid game are illustrated. In several embodiments, a transportable variables hybrid game is a form of a hybrid game that integrates a transportable variables module with both a gambling game that includes a real world engine (RWE) which manages the gambling game, as well as an entertainment game that includes a game world engine (GWE) which manages the entertainment portion of a game, and an entertainment software engine (ESE) which executes the entertainment game for user entertainment. In certain embodiments, the transportable variables hybrid game also includes a user interface associated with either or both the gambling game and the entertainment game. A player of a transportable variables hybrid game is the electronic representation of interactions, typically via the user interface, associated with a player profile of the transportable variables hybrid game. In operation of a transportable variables hybrid game, a player acts upon various types of elements of the entertainment game in a game world environment. In playing the entertainment game, using the elements, a player can, optionally, consume and accrue game world credits (GWC) within the entertainment game. These credits can be in the form of (but are not limited to) game world objects, experience points, or points generally. Elements are a limited resource consumed within an entertainment game to advance entertainment game gameplay. Example elements include enabling elements (EE) which are immediately consumable elements that enable a player's play of the entertainment game and whose consumption by the player while playing the entertainment game may trigger an entertainment gameplay gambling event. Another example of an element are reserve enabling elements (REE), which are elements that convert into enabling elements upon occurrence of a release event in transportable variable hybrid game gameplay. Other types of elements include actionable elements (AE) which are elements that are acted upon to trigger a wager in the gambling game and may not be restorable during normal play of the entertainment game. In progressing through entertainment game gameplay, elements can be utilized by a player during interactions with a controlled entity (CE) which is a character, entity, inanimate object, device or other object under control of a player. Also, entertainment game gameplay progress can be dependent upon: a required object (RO) which is a specific object in an entertainment game necessary for an AE to be completed (such as but not limited to a specific key needed to open a door); a required environmental condition (REC) which is a game state necessary within an entertainment game for an AE to be completed (such as but not limited to daylight that is required to walk through woods); or a controlled entity characteristic (CEC) which is a status necessary of the CE within an entertainment game for an AE to be completed (such as but not limited to a CE required to have full health points before entering battle). Various hybrid games are discussed in Patent Cooperation Treaty Application No. PCT/US11/26768, filed Mar. 1, 2011, entitled ENRICHED GAME PLAY ENVIRONMENT (SINGLE and/or MULTI-PLAYER) FOR CASINO APPLICATIONS and Patent Cooperation Treaty Application No. PCT/US11/63587, filed Dec. 6, 2011, entitled ENHANCED SLOT-MACHINE FOR CASINO APPLICATIONS each disclosure of which is hereby incorporated by reference in its entirety.

In many embodiments, a transportable variables hybrid game is a hybrid game with a transportable variables module that manages a wager of elements along with the relationship between elements and real world credits (RWC). RWC can be credits in an actual currency, or may be credits in a virtual currency which has real world value. A transportable variables module can manage the wager of elements by communicating an entertainment gameplay gambling event occurrence based upon a player's skillful execution of the entertainment game to a gambling game executed by a RWE that triggers the wager of elements in the gambling game. An entertainment gameplay gambling event occurrence can be any type of occurrence within a transportable variables hybrid game associated with entertainment game gameplay with a player whose elements are wagered, such as a human player associated with a human player profile, from a user interface or a computer player generated automatically from information in a computer player profile stored within the transportable variables hybrid game. An entertainment gameplay gambling event occurrence can be a player action in gameplay performed by a player (such as but not limited to a player's CE entering a tavern) or an action in gameplay not performed by the player that still affects the player (such as but not limited to a player's CE receiving a kill shot from another player's CE in a shooting type of entertainment game). An entertainment gameplay gambling event occurrence can be defined by an operator of a transportable variables entertainment game (such as but not limited to a casino that hosts the transportable variables hybrid game) or by players of a transportable variables hybrid game.

In various embodiments, the transportable variables module can receive information from a RWE related to the randomly generated payout of elements from a gambling game. This information can be utilized by the transportable variables module to manage these payouts by associating elements with a player based upon elements accrued during the player's skillful execution of the entertainment game and the randomly generated payout of elements for the player from the gambling game.

In several embodiments, a wager of elements can be made in the gambling game during an entertainment game gameplay session using elements to earn a payout of elements. Gambling outcomes from the gambling game may cause consumption, loss and/or accrual of elements. In certain embodiments, wagers can also be made in the gambling game during an entertainment game gameplay session using RWC to earn a payout of RWC. Real world credit gambling outcomes from the gambling game may cause consumption, loss or accrual of RWC. In addition, gambling outcomes of RWC in the gambling game may influence elements in the entertainment game such as (but not limited to) by restoring a consumed element, causing the loss of an element, restoration or placement of a fixed element.

In several embodiments, relationships between elements and RWC can be managed by a transportable variables module utilizing a function that converts real world credits provided by a player into elements utilizable in an entertainment game. Additionally, a transportable variables module can also manage the relationship between elements and RWC by utilizing an inverse function capable of determining a cash out value of real world credits converted from elements associated with a player. The cash out value can be used to inform a player of the RWC value of the elements associated with the player, such as but not limited to by being displayed on a user interface accessible by the player, or to instruct the transportable variables hybrid game on how to convert the elements associated with a player into a RWC cash out for the player. The function can utilize an entertainment game's variable set along with input from an operator that hosts the transportable variables hybrid game, such as but not limited to a casino or other entity. After RWC is converted into elements, the state of a first function that converted RWC into elements can be stored and utilized by an inverse function to use the inverse of the conversion rate implemented by the first function to determine a conversion rate of elements associated with a player into RWC for the player. Also, an inverse function can utilize an entertainment game's variable set along with input from an operator that hosts the transportable variables hybrid game, such as but not limited to a casino or other entity. An entertainment game gameplay variable set includes variables that can vary during entertainment game gameplay progression (such as but not limited to RWC, GWC, EE, AE, ROs, RECs, and CECs).

In numerous embodiments, a transportable variables module can be implemented locally on a transportable variables hybrid game within the GWE to manage the wagering of elements executed by the RWE and the relationship between elements and RWC, remotely on a transportable variables server accessible to a transportable variables hybrid game via a network or as a distributed system where processes of a transportable variables module occur locally on a transportable variables hybrid game and on a remote server.

In several embodiments, a transportable variables module can access a database containing various player profiles, an entertainment game's variable set, payouts of elements from a gambling game, function states that dictate the relationships between RWC and elements and any other aspect of a transportable variables hybrid game. A transportable variables module can utilize the database to store and retrieve information related to players and/or gameplay within a transportable variables hybrid game. In certain embodiments, the GWE can track the players engaged in gameplay with the transportable variables module managing the gambling of elements and the relationships between elements and RWC.

Transportable variables hybrid games in accordance with embodiments of the invention are discussed below.

Transportable Variables Hybrid Games

In many embodiments, a transportable variables hybrid game integrates high levels of entertainment content with a game of skill (entertainment game) with a gambling experience with a game of chance (gambling game). A transportable variables hybrid game provides for random outcomes independent of player skill while providing that the user's gaming experience (as measured by obstacles/challenges encountered, time of play and other factors) is shaped by the player's skill. The transportable variables hybrid game can utilize a transportable variables module to manage the wagering of elements performed by a RWE along with the relationship between RWC and elements. A transportable variables hybrid game in accordance with an embodiment of the invention is illustrated in FIG. 1. The transportable variables hybrid game 128 includes a RWE 102, GWE 112, ESE 120, gambling game user interface 122 and entertainment game user interface 124. The two user interfaces may be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In several embodiments, the RWE 102 is the operating system for the gambling game of the transportable variables hybrid game 128 and controls and operates the gambling game. The operation of a gambling game can be enabled by elements, such as but not limited to EE, REE or AE, or RWC, such as money or other real world funds. A gambling game can increase or decreases an amount of elements or RWC based on random gambling outcomes, where the gambling proposition of a gambling game is typically regulated by gaming control bodies. In many embodiments, the RWE includes a RW operating system (OS) 104, random number generator (RNG) 106, level n gambling pay tables (Gambling Table Ln) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n gambling pay table (Gambling Table Ln) 108 is a table that can be used in conjunction with a random number generator (RNG) 106 to dictate the elements or RWC earned as a function of gambling game gameplay and is analogous to the pay tables used in a conventional slot machine. Gambling Table Ln payouts are independent of player skill. There may be one or a plurality of Gambling Table Ln pay tables 108 contained in a gambling game, the selection of which may be determined by factors including (but not limited to) game progress a player has earned, and/or bonus rounds for which a player may be eligible. Real world credits (RWC) are credits analogous to slot machine game credits, which are entered into a gambling game by the user, either in the form of money such as hard currency or electronic funds. Elements can be entered and wagered in a gambling game when associated with a player in an entertainment game gameplay session. Elements and/or RWC can be decremented or augmented based on the outcome of a random number generator according to the Gambling Table Ln pay table 108, independent of player skill. In certain embodiments, an amount of elements and/or an amount of RWC can be required to enter higher ESE game levels. Elements and/or RWC can be carried forward to higher game levels or paid out if a cash out is opted for by a player. The amount of elements or the amount of RWC required to enter a specific level of the game level n need not be the same for each level.

In many embodiments, the GWE 112 manages the overall transportable variables hybrid game operation, with the RWE 102 and the ESE 120 effectively being support units to the GWE 112. In several embodiments, the GWE 112 contains mechanical, electronic and software system for an entertainment game. The GWE 112 includes a GW game operating system (OS) 114 that provides control of the entertainment game. The GWE additionally contains a level n game world credit pay table (Table Ln-GWC) 116 from where to take input from this table to affect the play of the entertainment game. The GWE 112 can further couple to the RWE 102 to determine metrics of wagering on the gambling game and affect the quantity of elements or RWC wagered on the RWE. The GWE additionally contains various audit logs and activity meters (such as the GWC meter) 118. The GWE 112 can also couple to a centralized server for exchanging various data related to players and their activities on the game. The GWE 112 furthermore couples to the ESE 120.

In many embodiments, a level n game world credit pay table (Table Ln-GWC) 116 dictates the GWC earned as a function of player skill in the nth level of the game. In several embodiments, game world credits (GWC) are player points earned or depleted as a function of player skill, specifically as a function of player performance in the context of the game. GWC is analogous to the score in a typical video game. Each entertainment game can have one or more scoring criterion, embedded within the Table Ln-GWC 116 that reflects player performance against the goal(s) of the game. GWC can be carried forward from one level of gameplay to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In certain embodiments, the operation of the GWE does not affect the RWE's gambling operation except for player choice parameters that are allowable in slot machines today including but not limited to wager terms such as but not limited to a wager amount (such as but not limited to in elements or RWC), how fast the player wants to play (by pressing a button or pulling the slot's handle) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the number of elements and/or amount of RWC available in the gambling game. The communication link can also convey a necessary status operation of the RWE (such as on-line or tilt). The communication link can further communicate the various gambling control factors which the RWE 102 uses as input, such as the quantity of elements or RWC to be wagered in a gambling game or the player's election to enter a jackpot round. In FIG. 1, the GWE 112 is also shown as connecting to the player's user interface directly, as this may be utilized to communicate certain entertainment game club points, player status, control the selection of choices and messages which a player may find useful in order to adjust the entertainment game experience or understand gambling status in the RWE 102.

In various embodiments, the ESE 120 manages and controls the visual, audio, and player control for the entertainment game. In certain embodiments, the ESE 120 accepts input from a player through a set of hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an ESE can be an electromechanical game system of a transportable variables hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 can operate mostly independently from the GWE 112, except that via the interface, the GWE 112 may send certain GW game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements may be based on a gambling outcome of a gambling game that was triggered by an element in the entertainment game being acted upon by the player. The ESE 120 can accept this input from the GWE 112, make adjustments, and continue the play action all the while running seamlessly from the player's perspective. The ESE's operation is mostly skill based, except for where the ESE's processes may inject complexities into the game by chance in its normal operation to create unpredictability in the entertainment game. Utilizing this interface, the ESE 120 may also communicate player choices made in the game to the GWE 112, such as but not limited to selection of a different gun, and/or the player picking up a special potion in the GW environment. The GWE's job in this architecture, being interfaced thusly to the ESE 120, is to allow the transparent coupling of entertainment software to a fair and transparent random chance gambling game, providing a seamless perspective to the player that they are playing a typical popular skill based entertainment game. In certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In several embodiments, the RWE 102 can accept a trigger from an entertainment gameplay gambling event occurrence to run a gambling game in response to actions taken by the player in the entertainment game. Information utilized to determine if an entertainment gameplay gambling event has occurred can be as detected by a GWE 112 utilizing a transportable variables module 130 to monitor the activities of an entertainment game executed by an ESE 120. The GWE utilizing a transportable variables module can also inform the player of the wager terms of the gambling game, such as (but not limited to) odds, amount of elements and/or RWC in play, and a quantity of elements and/or RWC available. The GWE utilizing the transportable variables module can also communicate with the RWE to integrate the gambling game with the entertainment game by managing how wagers of elements and/or RWC are made by the RWE in accordance with the proper wager terms. Furthermore, the GWE utilizing the transportable variables module can communicate entertainment gameplay gambling event occurrence based upon a player's skillful execution of the entertainment game that trigger the wager of elements in the gambling game to the gambling game. The RWE 102 can accept modifications sent from the GWE utilizing the transportable variables module concerning the quantity of elements and/or RWC wagered on each individual gambling try, or the number of games per minute the RWE 102 can execute, entrance into a bonus round, and other factors, all while these factors can take a different form than that of a typical slot machine. An example of a varying wager amount that the player can choose might be that they have decided to play with a more powerful character in the game, a more powerful gun, or a better car. These choices can increase or decrease the amount wagered (of elements of GWC) per individual gambling game, in the same manner that a standard slot machine player may decide to wager more or less credits for each pull of the handle. In several embodiments, a number of factors can be communicated back and forth between the RWE 102 and the GWE 112, via an interface, such increase/decrease in a wager amount or different odds per wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In a particular embodiment, the RWE 102 operation can be a game of chance as a gambling game running every 10 seconds where the amount wagered is communicated from the GWE 112 as a function of choices the player makes in the operation profile in an entertainment game.

In many embodiments, a transportable variables hybrid game integrates a video game style gambling machine, where the gambling game (including an RWE 102 and RWC) is not player skill based, while at the same time allows players to use their skills to earn club points in which a casino operator can translate to rewards, tournament opportunities and prizes for the players. The actual exchange of GWC earned or lost directly from gambling against a game of chance in a gambling game, such as a slot machine, is preserved. At the same time a rich environment of rewards to stimulate gamers can be established with the entertainment game. In several embodiments, the transportable variables hybrid game can leverage very popular titles with gamers and provides a sea change environment for casinos to attract players with games that are more akin to the type of entertainment that a younger generation desires. In various embodiments, players can use their skill towards building and banking GWC that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In certain embodiments, transportable variables hybrid games also allow players to gain entry into subsequent competitions through the accumulation of game world credits (GWC) that accrue as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue.

In many embodiments, one or more players engage in playing an entertainment game, resident in the ESE, the outcomes of which are dependent at least in part on skill. The transportable variables hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where there is only one player (such as but not limited to Solitaire and Babette).

In many embodiments, when an entertainment game includes a version of Madden Football™ a player can wager on whether or not the player is going to beat the computer, or a player that the player is playing against. These wagers can be made on the final outcome of the game, and/or the state of the game along various intermediary points (such as but not limited to the score at the end of the 1st quarter) and/or on various measures associated with the game (such as but not limited to the total offensive yards, number of turnovers, or number of sacks). Players can wager against one another, or engage the computer in a head to head competition in the context of their skill level in the entertainment game in question. As such, players can have a handicap associated with their player profile that describes their skill (which can be their professed skill in certain embodiments), and which is used by a GWE (such as a local GWE or a GWE that receives services from remote servers)

to offer appropriate wagers around the final and/or intermediate outcomes of the entertainment game, and/or to condition gameplay as a function of player skill, and/or to select players across one or more transportable variables hybrid games to participate in head to head games and/or tournaments.

Many embodiments enable the maximization of the number of players able to compete competitively by enabling handicapping of players by utilizing a skill normalization module that handicaps players to even the skill level of players competing against each other. Handicapping enables players of varying performance potential to compete competitively regardless of absolute skill level, such as but not limited to where a player whose skill level identifies the player as a beginner can compete in head to head or tournament play against a highly skilled player with meaningful results.

In several embodiments, wagers can be made among numerous transportable variables hybrid games with a global betting manager (GBM). The GBM is a system that coordinates wagers that are made across multiple transportable variables hybrid games by multiple players. In some implementations it can also support wagers by third parties relative to the in game performance of other players. The GBM can stand alone, or is capable of being embedded in one of a number of systems, including a GWE, ESE or any remote server capable of providing services to a transportable variables hybrid game, or can operate independently on one or a number of servers on-site at a casino, as part of a larger network and/or the internet or cloud in general. The GBM also supports the management of lottery tickets issued as a function of gameplay.

Although various components of transportable variables hybrid games are discussed above, transportable variables hybrid games can be configured with any component as appropriate to the requirements of a specific application in accordance with embodiments of the invention. Network connected transportable variables hybrid games are discussed below.

Network Connected Transportable Variables Hybrid Games

Transportable variables hybrid games in accordance with many embodiments of the invention can operate locally while being network connected to draw services from remote locations or to communicate with other transportable variables hybrid games. In many embodiments, operations associated with a transportable variables hybrid game utilizing a transportable variables module can be performed across multiple devices. These multiple devices can be implemented using a single server or a plurality of servers such that a transportable variables hybrid game is executed as a system in a virtualized space, such as (but not limited to) where the RWE and GWE are large scale centralized servers in the cloud coupled to a plurality of widely distributed ESE controllers or clients via the Internet.

In many embodiments, an RWE server can perform certain functionalities of a RWE of a transportable variables hybrid game. In certain embodiments, a RWE server includes a centralized odds engine which can generate random outcomes (such as but not limited to win/loss outcomes) for a gambling game, thereby eliminating the need to have that functionality of the RWE performed locally within the transportable variables hybrid game. The RWE server can perform a number of simultaneous or pseudo-simultaneous runs in order to generate random outcomes for a variety of odds percentages that one or more networked transportable variables hybrid games may require. In certain embodiments, an RWE of a transportable variables hybrid game can send information to a RWE server including (but not limited to) Gambling Table Ln tables, maximum speed of play for a gambling game, gambling game monetary denominations or any promotional RWC provided by the operator of the transportable variables hybrid game. In particular embodiments, a RWE server can send information to a RWE of a transportable variables hybrid game including (but not limited to) RWC used in the gambling game, player profile information or play activity and a profile associated with a player.

In several embodiments, a GWE server can perform the functionality of the GWE across various transportable variables hybrid games. These functionalities can include (but are not limited to) providing a method for monitoring high scores on select groups of games, coordinating interactions between gameplay layers, linking groups of games in order to join them in head to head tournaments, and acting as a tournament manager.

In a variety of embodiments, management of player profile information can be performed by a GWE patron management server separate from a GWE server. A GWE patron management server can manage information related to a player profile, including (but not limited to) data concerning controlled entities (such as characters used by a player in entertainment game gameplay), game scores, elements, RWC and GWC associated with particular players and managing tournament reservations. Although a GWE patron management server is discussed separate from a GWE server, in certain embodiments a GWE server also performs the functions of a GWE patron management server. In certain embodiments, a GWE of a transportable variables hybrid game can send information to a GW patron management server including (but not limited to) elements, GWC and RWC used in a game, player profile information, play activity and profile information for players and synchronization information between a gambling game and an entertainment game or other aspects of a transportable variables hybrid game. In particular embodiments, a GW patron management server can send information to a GWE of a transportable variables hybrid game including (but not limited to) entertainment game title and type, tournament information, Table Ln-GWC tables, special offers, character or profile setup and synchronization information between a gambling game and an entertainment game or other aspects of a transportable variables hybrid game.

In numerous embodiments, an ESE server provides a host for managing head to head play, operating on the network of ESEs which are connected to the ESE server by providing an environment where players can compete directly with one another and interact with other players. Although an ESE server is discussed separate from a GWE server, in certain embodiments a GWE server also performs the functions of an ESE server.

In several embodiments, a transportable variables server can be connected with a transportable variables hybrid game and can implement a transportable variables module to coordinate the activities of a transportable variables hybrid game. A transportable variables module can execute as part of a transportable variables server to coordinate a wager of elements for a payout of elements and the relationship between elements and RWC throughout the course of a transportable variables hybrid game gameplay session.

Servers connected via a network to implement transportable variables hybrid games in accordance with many embodiments of the invention can communicate with each other to provide services utilized within a transportable variables hybrid game. In several embodiments a RWE server can communicate with a GWE server. A RWE server can communicate with a GWE server to communicate any type of information as appropriate for a specific application, including (but not limited to): configure the various simultaneous or pseudo simultaneous odds engines executing in parallel within the RWE to accomplish the transportable variables hybrid game system requirements, determine metrics of RWE performance such as random executions run and outcomes for tracking system performance, perform audits, provide operator reports, and request the results of a random run win/loss result for use of function operating within the GWE (such as but not limited to where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server such as the management of a transportable variables hybrid game tournament. Typically a GWE (such as a GWE that runs within a transportable variables hybrid game or on a GWE server) is not aware of the relationship of itself to the rest of a tournament since in a typical configuration the actual tournament play is managed by the ESE server. Therefore, management of a transportable variables hybrid game tournament can include (but is not limited to) tasks such as: conducting tournaments according to system programming that can be coordinated by an operator of the transportable variables hybrid game; allowing entry of a particular player into a tournament; communicating the number of players in a tournament and the status of the tournament (such as but not limited to the amount of surviving players, their status within the game, time remaining on the tournament); communicating the status of an ESE contained in a game; communicating the performance of its players within the tournament; communicating the scores of the various members in the tournament; and providing a synchronizing link to connect the GWEs in a tournament, with their respective ESE's.

In several embodiments a GWE server can communicate with a GW patron server. A GWE server can communicate with a GW patron server to communicate any type of information as appropriate for a specific application, including (but not limited to) information for configuring tournaments according to system programming conducted by an operator of a transportable variables hybrid game, exchange of data necessary to link a player's player profile to their ability to participate in various forms of gameplay (such as but not limited to the difficulty of play set by the GWE server or the GWE in the game they are playing on), determining a player's ability to participate in a tournament as a function of a player's characteristics (such as but not limited to a player's gaming prowess or other metrics used for tournament screening), configuring the game contained GWE and ESE performance to suit preferences of a player on a particular transportable variables hybrid game, as recorded in their player profile, determining a player's play and gambling performance for the purposes of marketing intelligence, and logging secondary drawing awards, tournament prizes, elements, RWC and GWC into the player profile.

In many embodiments, the actual location of where various algorithms and functions are executed may be located either in the game contained devices (RWE, GWE, ESE), on the servers (RWE server, GWE server, or ESE server), or a combination of both. In particular embodiments, certain functions of a RWE server, GWE server, GW patron server or ESE server may operate on the local RWE, GWE or ESE contained with a transportable variables hybrid game locally. In certain embodiments, a server is a server system including a plurality of servers, where software may be run on one or more physical devices. Similarly, in particular embodiments, multiple servers may be combined on a single physical device.

Figure 2:
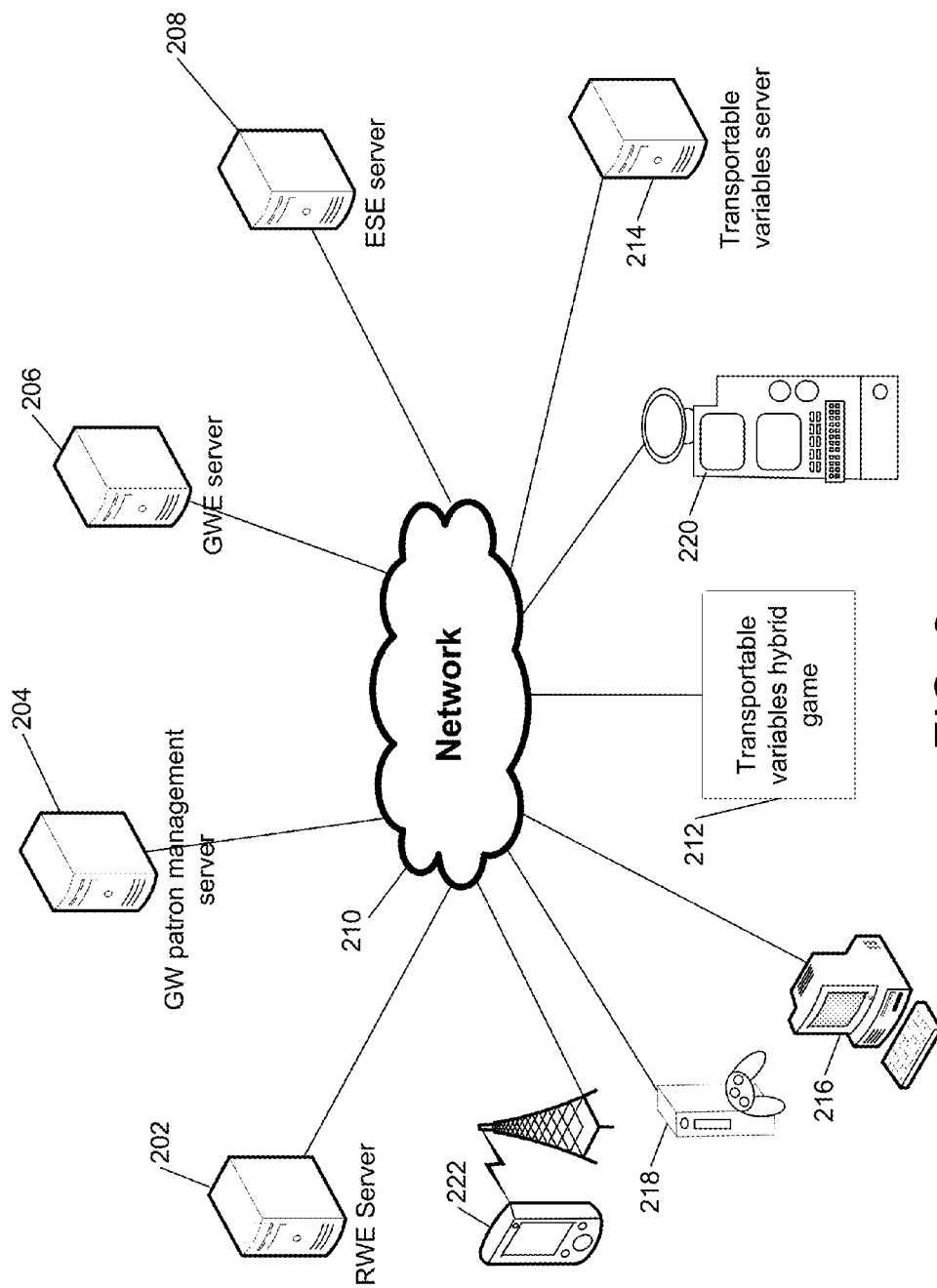
FIG. 2 is a system diagram that illustrates a network distributed transportable variables hybrid game in accordance with an embodiment of the invention.

Transportable variables hybrid games in accordance with many embodiments of the invention can be networked with remote servers in various configurations. A networked transportable variables hybrid game in accordance with an embodiment of the invention is illustrated in FIG. 2. The networked transportable variables hybrid game 212 is connected with a RWE server 202, GW patron management server 204, GWE server 206, ESE server 208 and a transportable variables server 214 over a network 210, such as (but not limited to) the Internet. Servers networked with a networked transportable variables hybrid game 212 can also communicate with each of the components of a networked transportable variables hybrid game and amongst the other servers in communication with the networked transportable variables hybrid game 212.

In various embodiments, transportable variables hybrid game may be implemented, in whole or in part, on a variety of devices, including, but not limited to, a personal computer 216, a gaming console 218, a casino game housed in a cabinet 220, or a mobile device 222 such as a tablet computer or smartphone.

Although various networked transportable variables hybrid games are discussed above, transportable variables hybrid games can be networked in any configuration as appropriate to the requirements of a specific application in accordance with embodiments of the invention. Transportable variables modules are discussed below.

Transportable Variables Modules

A transportable variables module in accordance with many embodiments of the invention can be utilized by a GWE to manage the relationships between real world credits and elements accumulated in an entertainment game and how elements are wagered in a gambling game to earn a payout of elements in the entertainment game. This can be contrasted (or used in conjunction in certain embodiments) with wagering RWC in a gambling game to earn a payout of RWC that can (but does not necessarily) result in a payout of elements. Thereby, in certain embodiments, earning a payout of elements from a game of chance executed by a RWE does not require any exchange of elements into or from RWC.

Figure 3:
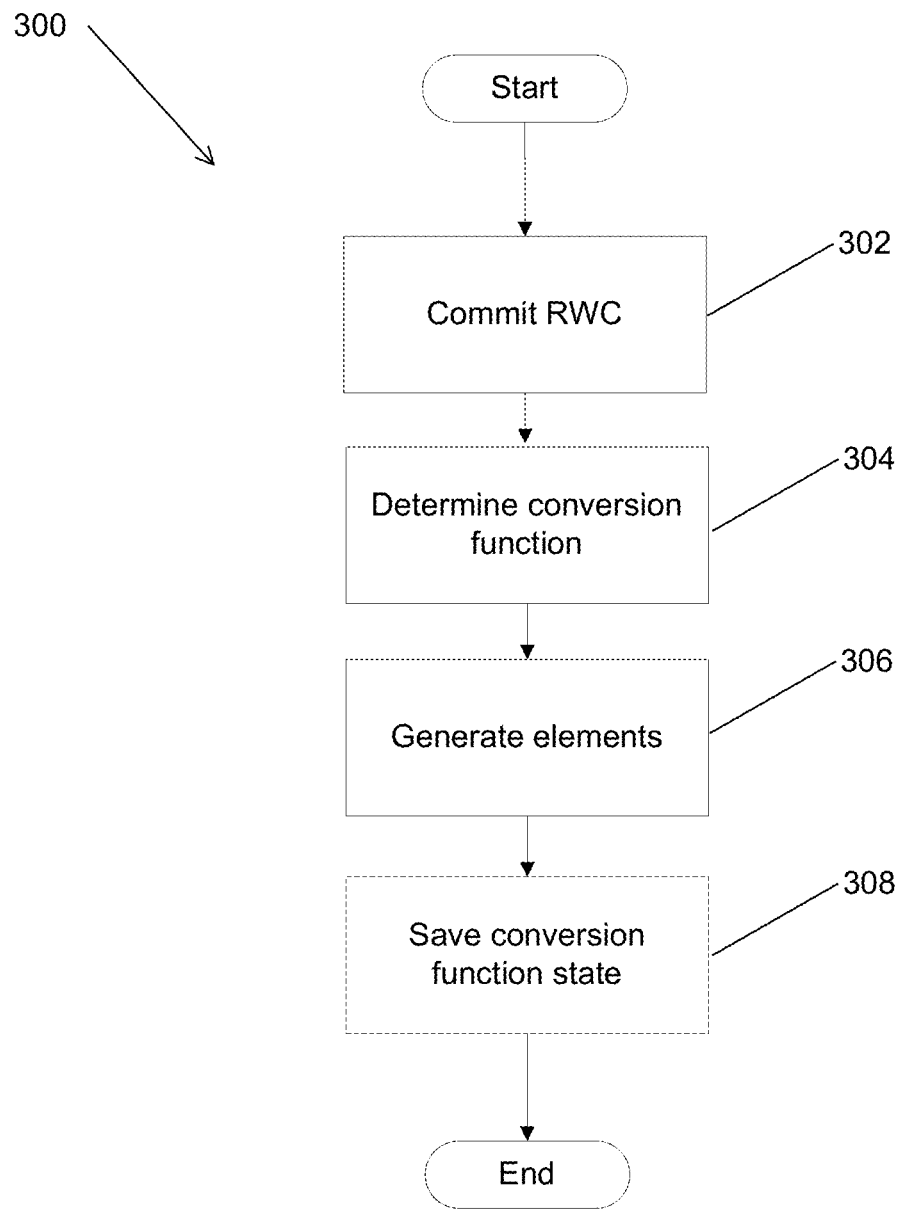
FIG. 3 illustrates a flow chart of a process for converting RWC to elements utilizing a conversion function in accordance with an embodiment of the invention.
Figure 4:
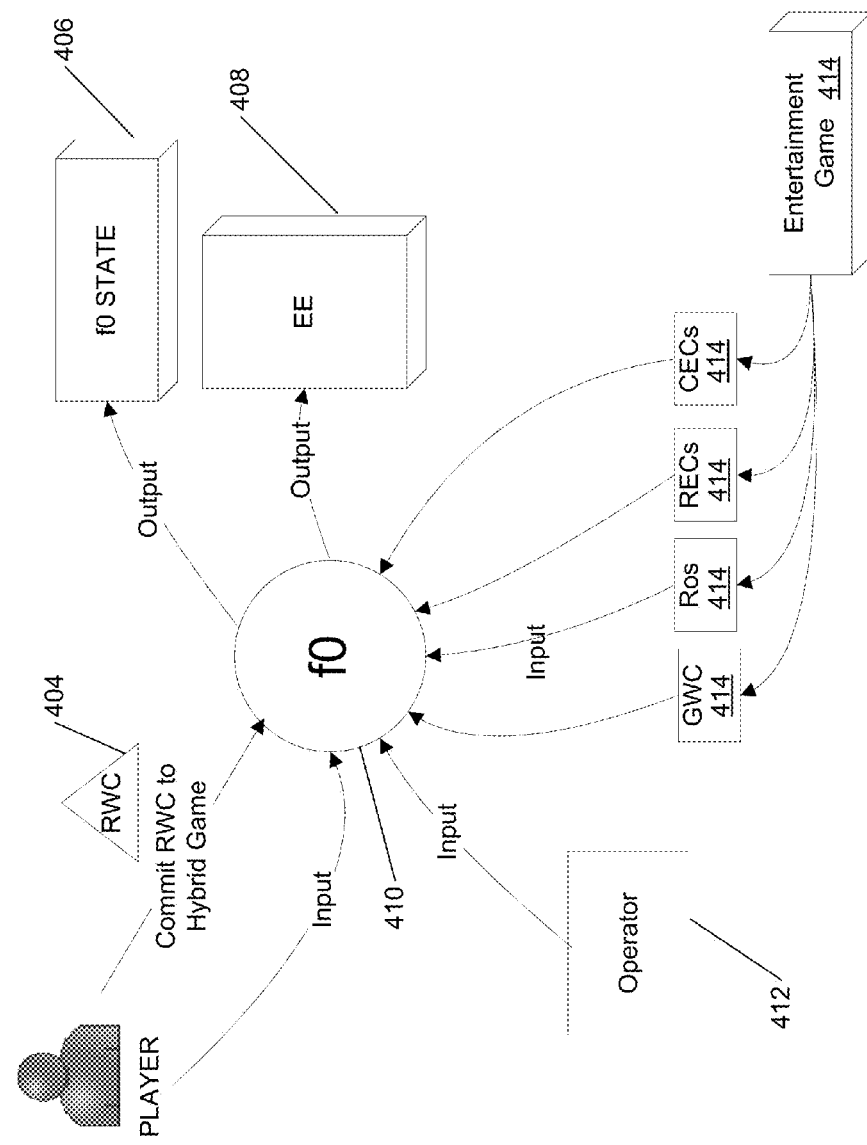
FIG. 4 illustrates a conceptual diagram that illustrates the conversion of RWC to elements in the process illustrated in FIG. 3 in accordance with an embodiment of the invention.

In several embodiments, RWC is provided to a transportable variables hybrid game to generate elements used in entertainment game gameplay. The RWC is converted into an appropriate quantity of elements based upon a conversion function. The conversion function determines the conversion rate of RWC to EE. The conversion function can determine the conversion rate of RWC to EE as set by an operator of the transportable variables hybrid game or dynamically in accordance with certain criteria. This criteria by which a conversion function can determine a conversion rate of RWC to EE can include any criteria ascertainable by a transportable variables module including (but not limited to) an entertainment game's variable set, settings for the conversion function as determined by an operator or from information concerning a player's play of a transportable variables hybrid game. A state of the conversion function, including but not limited to the conversion rate of RWC to EE, the factors (such as the values of input variables) utilized to determine the conversion rate, can be saved as a conversion function state. The conversion function state can be utilized by an inverse conversion function to facilitate the conversion of EE to RWC. A flowchart of a process of converting RWC to elements utilizing a conversion function in accordance with an embodiment of the invention is illustrated in FIG. 3. The process 300 includes detecting (302) the RWC committed to transportable variables hybrid game gameplay. A conversion function can be utilized to determine (304) the conversion rate of the RWC into elements that can be utilized in entertainment game gameplay. Once the conversion function is determined, elements can be generated (306) from the RWC committed. The conversion function state can be saved (308) in a database by the transportable variables hybrid game for future use, such as but not limited to use by an inverse function. A conceptual diagram that illustrates the conversion of RWC to elements in the process illustrated in FIG. 3 in accordance with an embodiment of the invention is illustrated in FIG. 4. The conceptual diagram illustrates that RWC 404 is committed to transportable variables hybrid gameplay to be converted to elements, such as but not limited to EE 408, based upon factors such as an entertainment game's variable set 404 and input from an operator 414 using a function 410. The function state 406 can be saved for future use by the transportable variables hybrid game.

In numerous embodiments, a transportable variables module manages the wagering of elements, utilized in an entertainment game, as executed by a RWE in a gambling game. The transportable variables module can also manage the relationships between elements and RWC, thereby attributing RWC value to elements that can be utilized in entertainment game gameplay. A transportable variables module can manage the wager of elements by communicating an entertainment gameplay gambling event occurrence based upon a player's skillful execution of the entertainment game to a gambling game executed by a RWE that triggers the wager of elements in the gambling game. An entertainment gameplay gambling event occurrence can be any type of occurrence within a transportable variables hybrid game associated within entertainment game gameplay with a player whose elements are wagered. Examples of entertainment gameplay gambling event occurrences can include (but are not limited to) a player action in gameplay performed by a player (such as a player's CE entering a market in the entertainment game) or an action in gameplay not performed by the player that still affects the player (such as an ambush that the player's CE walks into). An entertainment gameplay gambling event occurrence can be defined by an operator of a transportable variables entertainment game or by players of a transportable variables hybrid game.

In various embodiments, a transportable variables module receives information concerning the payout of elements made from a wager of elements executed by a RWE. The transportable variables module can work with the GWE to reallocate elements based upon the payout (such as but not limited to ascribing any elements earned in the payout to the appropriate player). Additionally, a value in RWC for elements that can be cashed out can also be calculated by a transportable variables module and presented in a user interface associated with a player or used to convert the available elements to RWC for a player.

In many embodiments, a transportable variables hybrid game can incorporate a first person shooter entertainment game gameplay theme. A player can initiate a gameplay session by committing 100 units of RWC, which can be converted using a transportable variables module to associate 100 elements (such as but not limited 100 bullets). Entertainment game gameplay can then commence utilizing the elements where each time an element is consumed (such as but not limited to each time a bullet is shot), a wager of elements (such as but not limited to bullets) is executed by the gambling game to result in a payout of elements directly in the entertainment game. This is in contrast to otherwise having the consumption of the element trigger a gambling event of RWC that is converted from elements to be wagered with a payout of RWC that is reconverted back into elements of the entertainment game. The elements can eventually be converted into RWC when the elements are cashed out from the transportable variables hybrid game.

Figure 5:
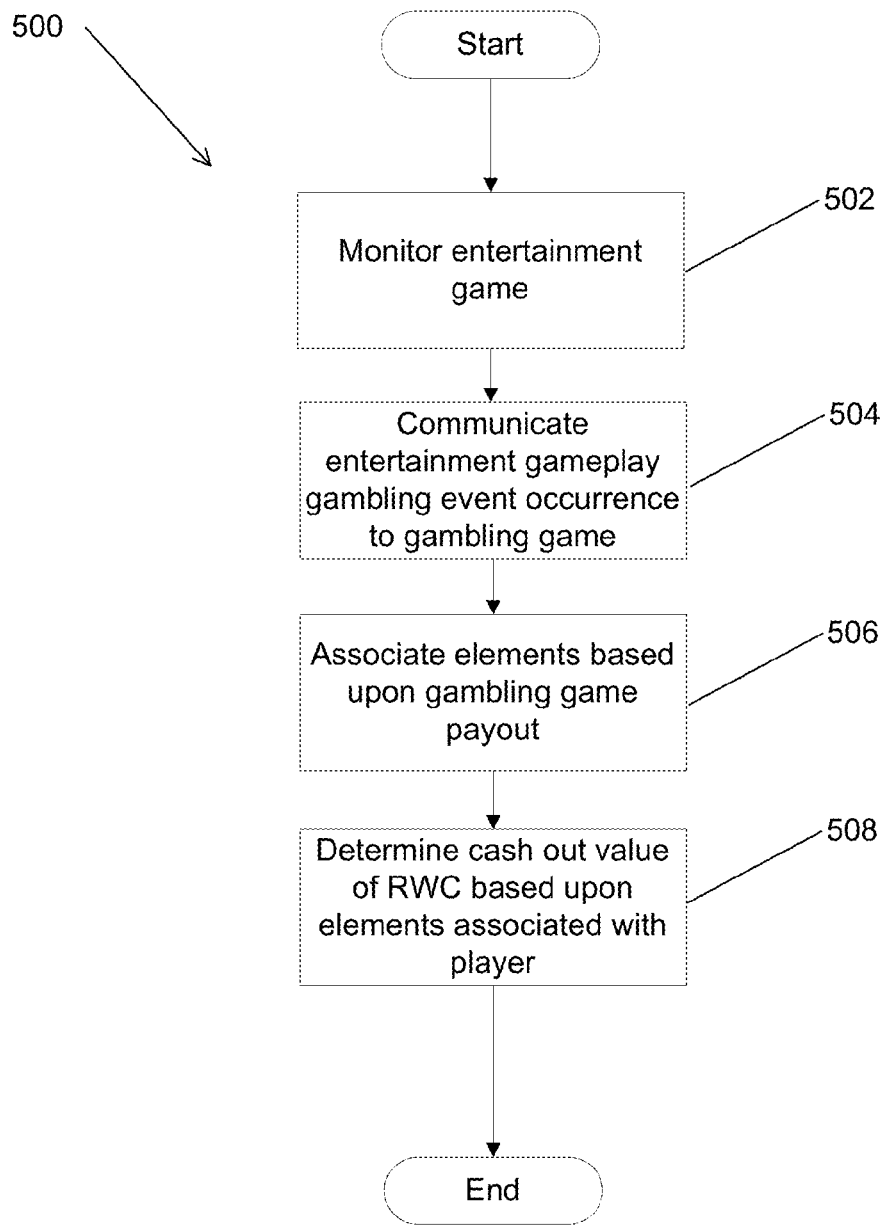
FIG. 5 is a flow chart of a process for wagering elements utilizing a transportable variables module in accordance with an embodiment of the invention.
Figure 6:
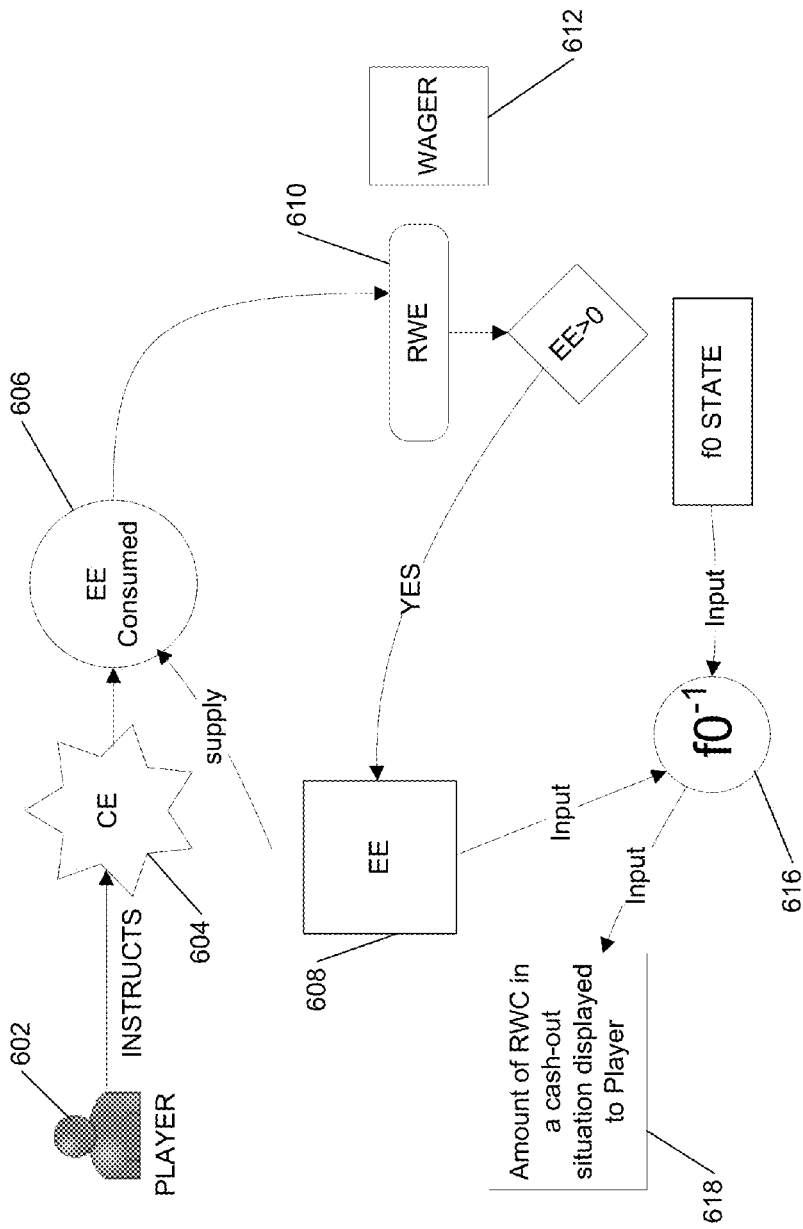
FIG. 6 illustrates a conceptual diagram that illustrates a process for wagering elements in accordance with an embodiment of the invention.

A flow chart of a process of wagering elements utilizing a transportable variables module in accordance with an embodiment of the invention is illustrated in FIG. 5. The process 500 includes a transportable variables module monitoring (502) an entertainment game for an entertainment gameplay gambling event occurrence. The occurrence of an entertainment gameplay gambling event can be communicated (504) to a RWE. The communication can include wager terms and an amount of elements to be wagered in a gambling game. A transportable variables module can receive information concerning the payout of elements from a wager and associate (506) the elements earned on account of the payout with the appropriate player. The transportable variable module can also determine (508) a cash out value of RWC based upon the elements associated with a player. This cash out value of RWC can be presented in a user interface or can be utilized by the transportable variables hybrid game in producing the cash out of RWC based upon elements associated with a player. A conceptual diagram that illustrates a process of wagering elements in accordance with an embodiment of the invention is illustrated in FIG. 6. The conceptual diagram illustrates how a player's 602 CE 604 can consume EE 606 in executing an entertainment game. A gameplay gambling event occurrence can be detected in the gambling event (such as but not limited to the utilization of an AE) that triggers a wager 612 of elements as executed by a gambling game using an RWE 610. The payout of EE 608 from the wager 612 can be added to the supply of elements 606 utilizable by the player's CE 604. Also, a cash out value of the elements 618 earned as displayed to a player utilizing an inverse function 616 to determine a converted value of GWC from the elements earned in a payout.

Figure 7:
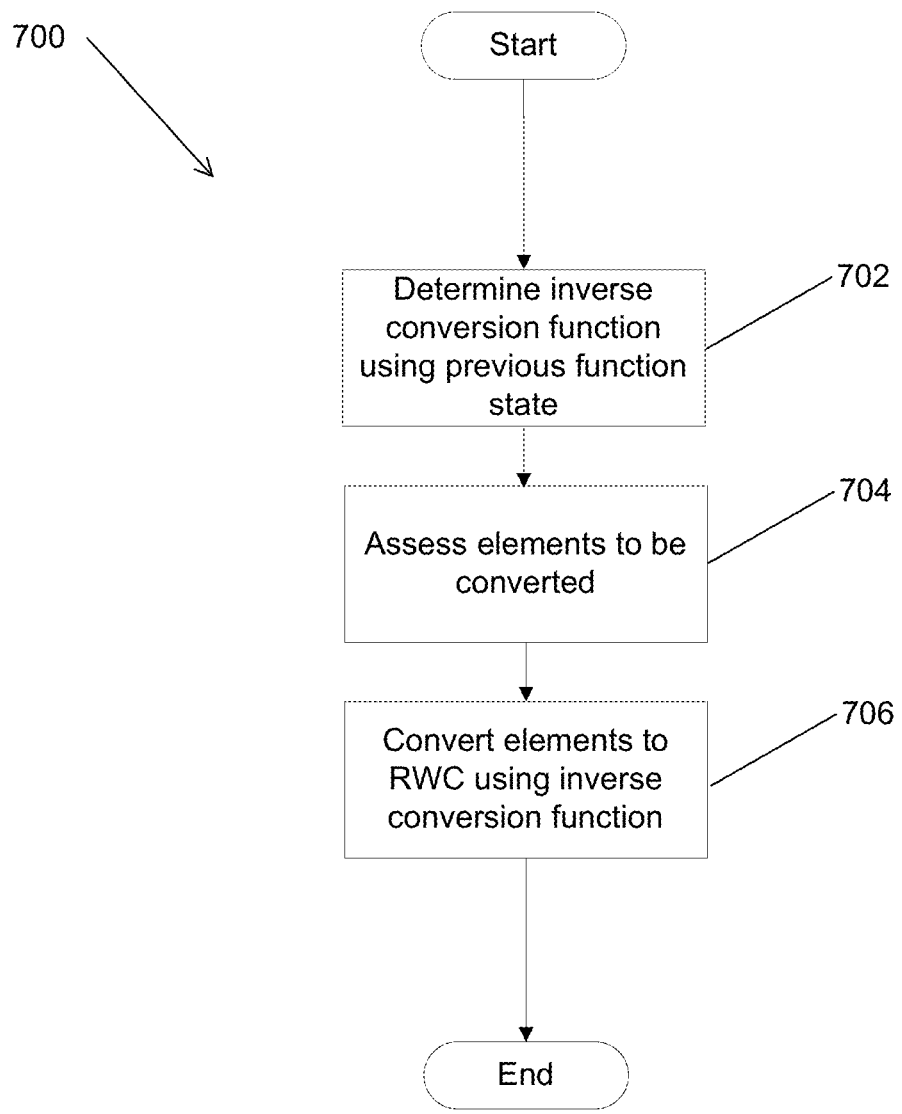
FIG. 7 is a flow chart of a process for determining cash out value of real world credits from elements using an inverse function that considers a previous function state in accordance with an embodiment of the invention.
Figure 8:
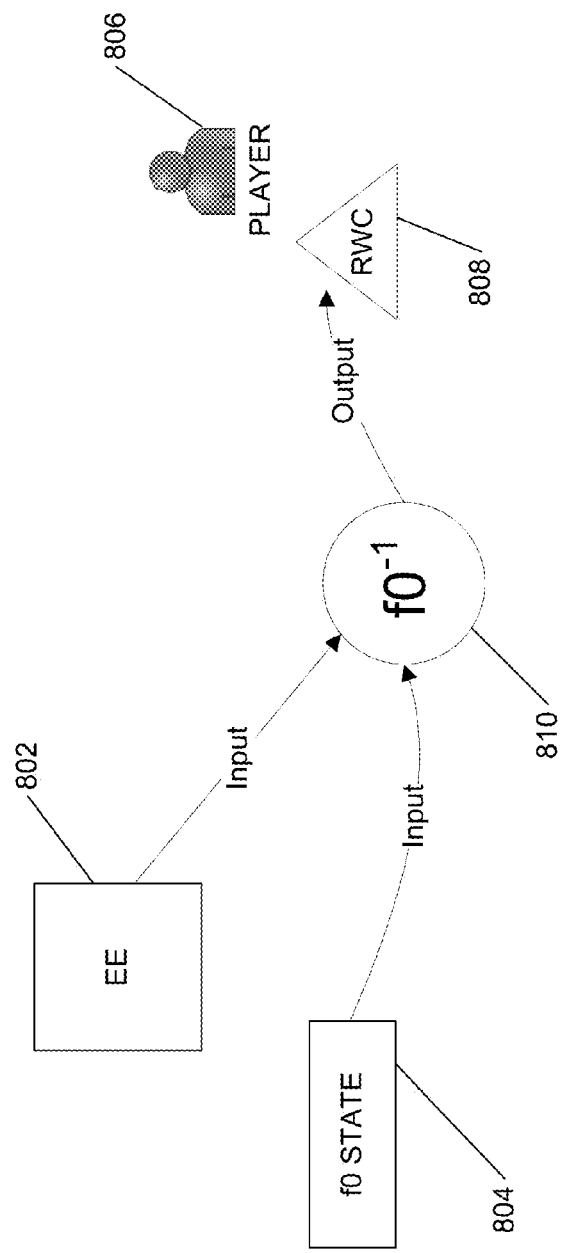
FIG. 8 is a conceptual diagram that illustrates the process of FIG. 7 in accordance with an embodiment of the invention.
Figure 9:
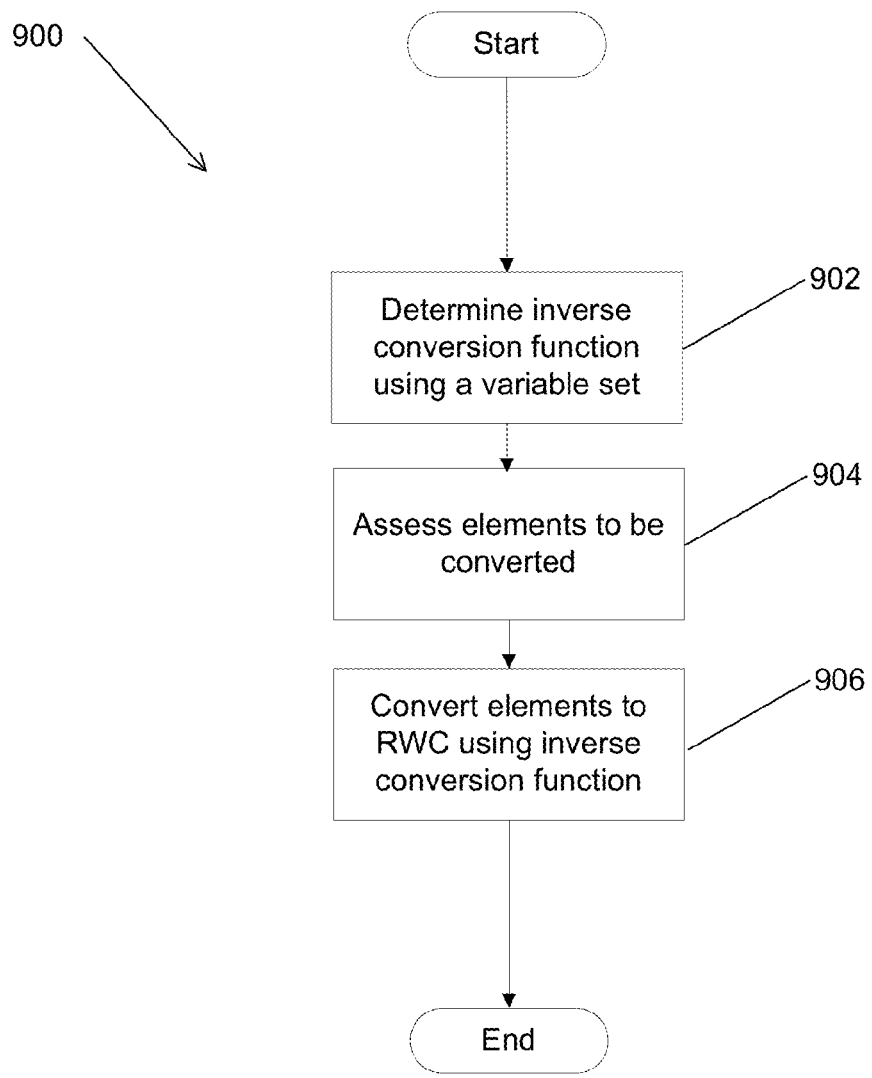
FIG. 9 is a flow chart of a process for determining cash out value of real world credits from elements using an inverse function that considers a transportable variables hybrid game's variable set in accordance with an embodiment of the invention.
Figure 10:
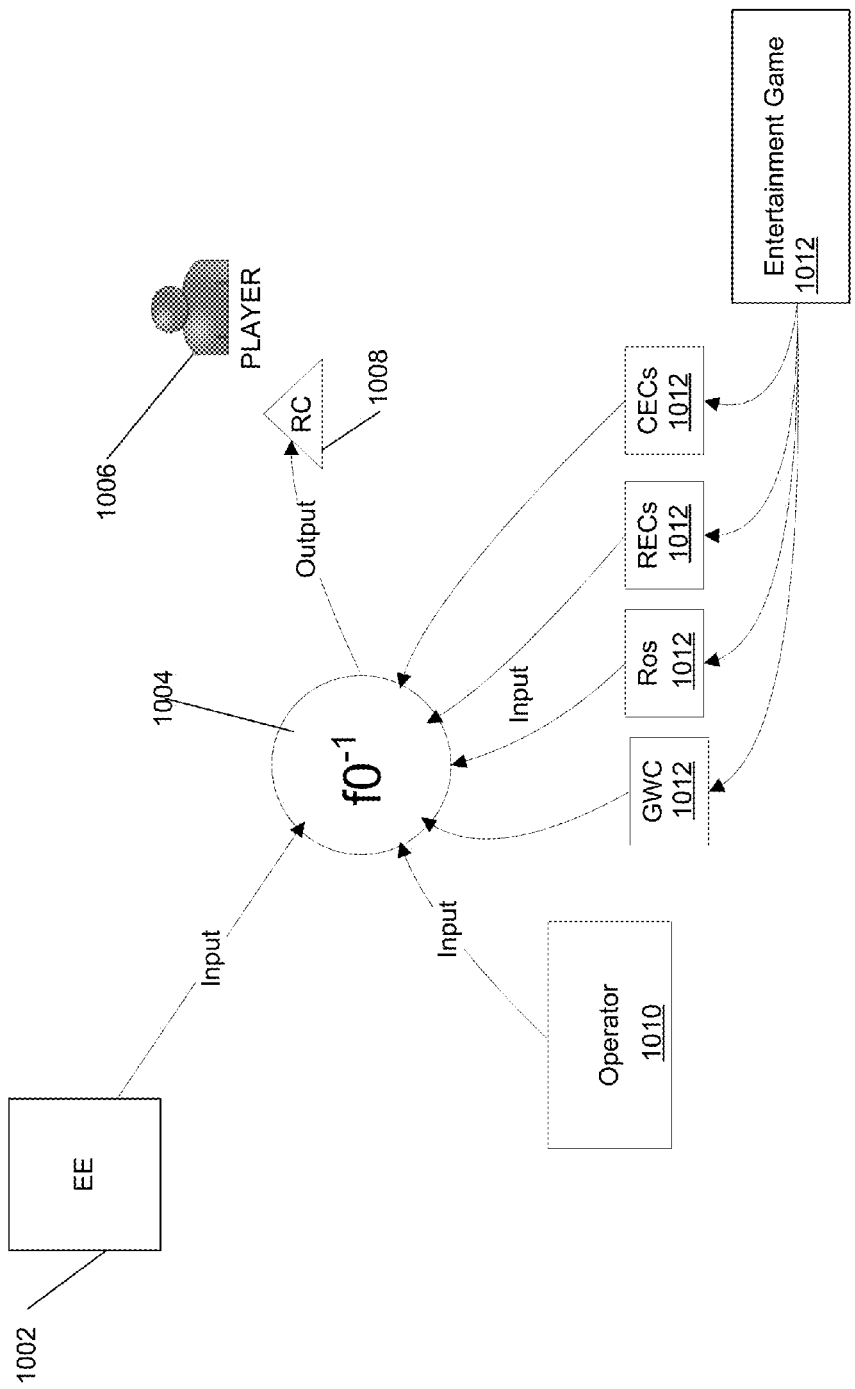
FIG. 10 is a conceptual diagram that illustrates the process of FIG. 9 in accordance with an embodiment of the invention.

In several embodiments, a cash out value of the elements earned can be determined utilizing an inverse function that defines a relationship between elements associated with a player in the entertainment game and a GWE cash out value. The inverse function can utilize any variables in determining the relationship including (but not limited to) a previous function state of a function that converted GWE into elements for the entertainment game, input from an operator of the transportable variables hybrid game and/or an entertainment game's variable set. In certain embodiments, an inverse function can utilize a previous function state to convert elements to RWC with the same exchange rate as that used by a previous function. The previous function state can be stored and retrieved from a database accessible by a transportable variables module. A flow chart of a process of determining cash out value of real world credits from elements using an inverse function that considers a previous function state in accordance with an embodiment of the invention is illustrated in FIG. 7. The process 700 includes determining (702) an inverse conversion function utilizing a previous function's state. The elements to be converted can be assessed (704) and then converted (706) utilizing the inverse conversion function. A conceptual diagram that illustrates the process of FIG. 7 in accordance with an embodiment of the invention is illustrated in FIG. 8. The diagram illustrates that an inverse function 810 can consider a stored previous function state 804 in converting EE 802 into RWC 808 for a player 806. Similarly, a flow chart of a process of determining cash out value of real world credits from elements using an inverse function that considers a transportable variables hybrid game's variable set in accordance with an embodiment of the invention is illustrated in FIG. 9. The process 900 includes determining (902) an inverse conversion function utilizing an entertainment game's variable set and input from an operator (such as but not limited to providing the settings by which values of the entertainment game's variable set are to be utilized in an algorithm that determines the conversion of elements to RWC). The elements to be converted can be assessed (904) and then converted (906) utilizing the inverse conversion function. A conceptual diagram that illustrates the process of FIG. 9 in accordance with an embodiment of the invention is illustrated in FIG. 10. The diagram illustrates that an inverse function 1004 can consider an entertainment game's variable set 1012 and input from an operator 1010 in converting EE 1002 into RWC 1008 for a player 1006.

Although various constructions of transportable variables modules are discussed above, transportable variables modules can be constructed to manage element wagers and a relationship between RWC and elements in various ways as appropriate to the requirements of a specific application in accordance with embodiments of the invention. In certain embodiments, transportable variable modules can utilize different functions and inverse functions to manage relationships between RWE and elements or different variables can be utilized by which wagers of elements are conducted in a gambling game. A discussion of a processing apparatus that can be implemented in a transportable variables hybrid game is discussed below.

Processing Apparatus

Figure 11:
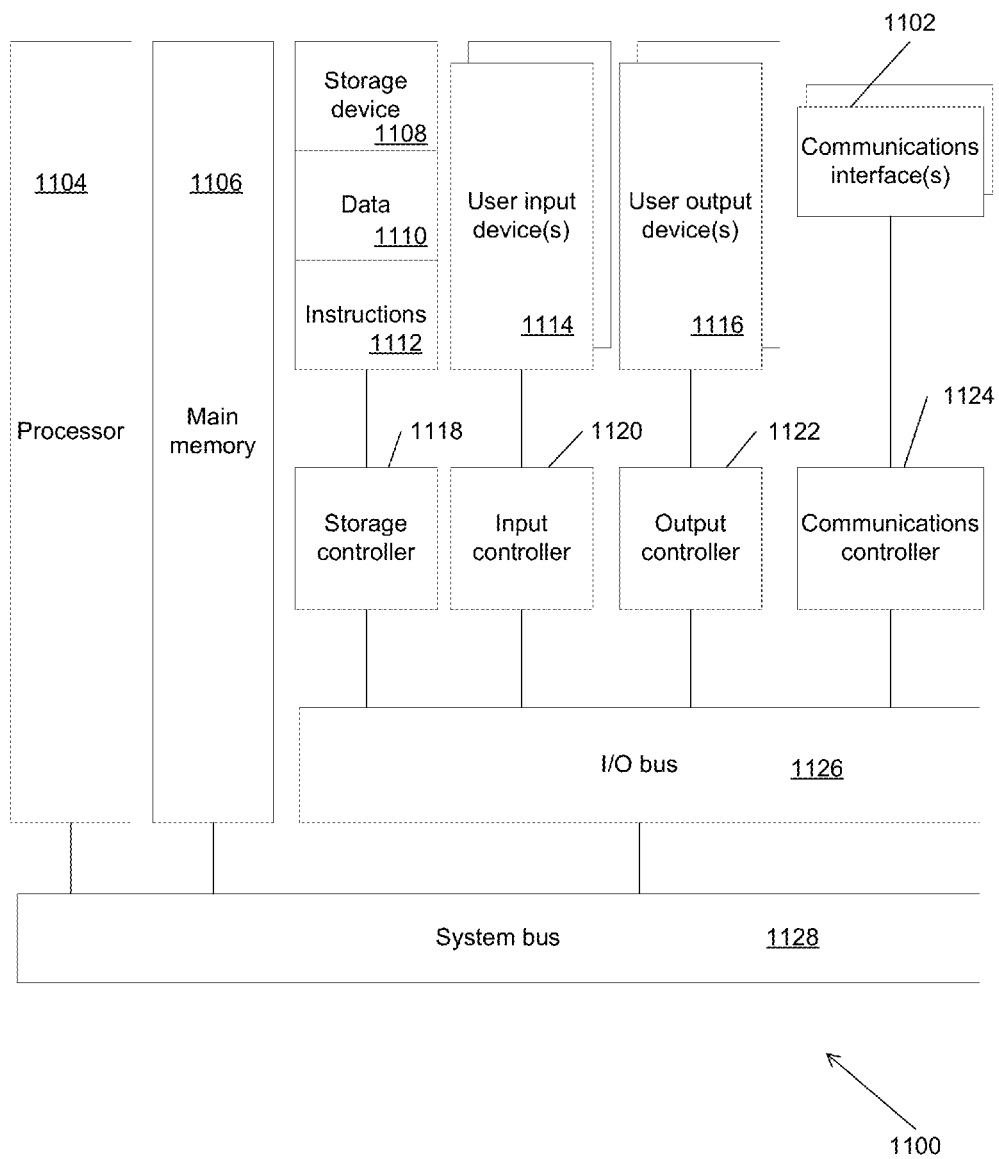
FIG. 11 illustrates a hardware architecture diagram of a processing apparatus utilized in the implementation of a transportable variables hybrid game in accordance with an embodiment of the invention.

Any of a variety of processing apparatuses can host various components of a transportable variables hybrid game in accordance with embodiments of the invention. In several embodiments, these processing apparatuses can include, but are not limited to, a mobile device such as a tablet computer or a smartphone, a casino gaming machine, a gaming console, a general purpose computer such as personal computer, a computing device and/or a controller. A processing apparatus that is constructed to implement a transportable variables hybrid game in accordance with an embodiment of the invention is illustrated in FIG. 11. In the processing apparatus 1100, a processor 1104 is coupled to a memory 1106 by a bus 1128. The processor 1104 is also coupled to non-transitory processor-readable storage media, such as a storage device 1108 that stores processor-executable instructions 1112 and data 1110 through the system bus 1128 to an I/O bus 1126 through a storage controller 1118. The processor 1104 is also coupled to one or more interfaces that may be used to connect the processor to other processing apparatuses as well as networks as described herein. The processor 1104 is also coupled via the bus to user input devices 1114, such as tactile devices including but not limited to keyboards, keypads, foot pads, touch screens, and/or trackballs, as well as non-contact devices such as audio input devices, motion sensors and motion capture devices that the processing apparatus may use to receive inputs from a user when the user interacts with the processing apparatus. The processor 1104 is connected to these user input devices 1114 through the system bus 1128, to the I/O bus 1126 and through the input controller 1120. The processor 1104 is also coupled via the bus to user output devices 1116 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 1128 to the I/O bus 1126 and through the output controller 1122. The processor 1104 can also be connected to a communications interface 1102 from the system bus 1128 to the I/O bus 1126 through a communications controller 1124.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, GWE or ESE as described herein can be implemented on multiple processing apparatuses, whether dedicated, shared or distributed in any combination thereof, or may be implemented on a single processing apparatus. In addition, while certain aspects and features of element management processes described herein have been attributed to an RWE, GWE, or ESE, these aspects and features may be implemented in a hybrid form where any of the features or aspects may be performed by any of a RWE, GWE, ESE within a transportable variables hybrid game without deviating from the spirit of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A transportable variables hybrid gaming system, comprising:
  an entertainment software engine connected to a game world engine, wherein the entertainment software engine is configured to generate a perceivable display of an entertainment game that provides outcomes based upon skillful execution of the entertainment game by a player utilizing a first amount of actionable elements of the entertainment game, where the actionable elements of the entertainment game are limited resources consumed within the entertainment game when the player acts upon the actionable elements to advance entertainment game gameplay;
  a real world engine connected to the game world engine, wherein the real world engine is constructed to provide a randomly generated payout of a second amount of the actionable elements of the entertainment game from a wager of a portion of the actionable elements of the entertainment game in a gambling game wherein the wager outcome is determined using a random number generator; and
  the game world engine, wherein the game world engines is constructed to:
    manage the entertainment software engine; and
    facilitate communication between the entertainment software engine and the real world engine by:
    generating the first amount of actionable elements of the entertainment game utilized by the player from a first amount of real world credits provided by the player to the transportable variables hybrid gaming system based upon a function, the function based on:
      a variable set of the entertainment game that are aspects of the entertainment game that can vary during entertainment game gameplay progression; and
      a conversion rate between the first amount of real world credits and the first amount of actionable elements of the entertainment game generated as instructed by an operator of the transportable variables hybrid gaming system;
    communicating to the real world engine an entertainment gameplay gambling event occurrence based upon the player acting on the first amount of actionable elements during the player's skillful execution of the entertainment game that triggers the wager of the portion of the first amount of the actionable elements of the entertainment game in the gambling game to provide the randomly generated payout of the second amount of the actionable elements and
    determining a cash out value of a second amount of real world credits for the randomly generated payout of the second amount of the actionable elements.

2. The transportable variables hybrid gaming system of claim 1, wherein the entertainment game's variable set includes at least one variable selected from the group consisting of enabling elements of the entertainment game that are immediately consumable elements of the entertainment game, reserve enabling elements that convert into enabling elements upon occurrence of a release event in transportable variable hybrid game gameplay, required objects in an entertainment game necessary for an actionable element of the entertainment game to be acted upon, required environmental conditions that are a game state necessary within an entertainment game for an actionable element of the entertainment game to be acted upon, and controlled entity characteristics which is a status necessary for a controlled entity associated with a player for an actionable element of the entertainment game to be acted upon.

3. The transportable variables hybrid gaming system of claim 1, wherein the cash out value of the second amount of real world credits is based upon an inverse function of a ratio of the first amount of actionable elements of the entertainment game to first amount of real world credits utilized to generate the first amount of actionable elements of the entertainment game associated with the player.

4. The transportable variables hybrid gaming system of claim 1, wherein the cash out value of the second amount of real world credits is based upon an inverse function of at least a portion of the entertainment game's variable set in determining a conversion rate between the first amount of real world credits and the first amount of actionable elements of the entertainment game as instructed by the operator of transportable variables hybrid gaming system.

5. The transportable variables hybrid gaming system of claim 4, wherein the entertainment game's variable set includes at least one variable selected from the group consisting of enabling elements of the entertainment game that are immediately consumable elements of the entertainment game that enable a player's play of the entertainment game, reserve enabling elements of the entertainment game that convert into enabling elements of the entertainment game upon occurrence of a release event in transportable variable hybrid game gameplay, required objects in an entertainment game necessary for an actionable element of the entertainment game to be acted upon, required environmental conditions that are a game state necessary within an entertainment game for an actionable element of the entertainment game to be acted upon, and controlled entity characteristics which is a status necessary for a controlled entity associated with a player for an actionable element of the entertainment game to be acted upon.

6. The transportable variables hybrid gaming system of claim 1, wherein the game world engine is further constructed to determine wager terms associated with the entertainment gameplay gambling event occurrence that define how the portion of the first amount of the actionable elements of the entertainment game are wagered by the real world engine.

7. The transportable variables hybrid gaming system of claim 6, wherein the wager terms include at least one wager term selected from the group consisting of odds of return for wagers in a pay table, and a relationship between a real world credits and the actionable elements of the entertainment game.

8. The transportable variables hybrid gaming system of claim 1, wherein the player of a transportable variables hybrid game is an electronic representation of interactions associated with a player profile of the transportable variables hybrid gaming system.

9. The transportable variables hybrid gaming system of claim 1, wherein the entertainment software engine and the game world engine are constructed from a same processing apparatus.

10. The transportable variables hybrid gaming system of claim 1, wherein the entertainment software engine and the game world engine are constructed from different processing apparatuses.

11. The transportable variables hybrid gaming system of claim 10, wherein the entertainment software engine and the game world engine communicate over a network.

12. The transportable variables hybrid gaming system of claim 1, wherein the real world engine and the game world engine are constructed from a same processing apparatus.

13. The transportable variables hybrid gaming system of claim 1, wherein the real world engine and the game world engine are constructed from different processing apparatuses.

14. The transportable variables hybrid gaming system of claim 13, wherein the real world engine and the game world engine communicate over a network.

* * * * *